US005958040A

United States Patent [19]
Jouppi

[11] Patent Number: 5,958,040
[45] Date of Patent: Sep. 28, 1999

[54] ADAPTIVE STREAM BUFFERS

[75] Inventor: Norman P. Jouppi, Palo Alto, Calif.

[73] Assignee: Digital Equipment Corporation, Maynard, Mass.

[21] Appl. No.: 08/864,125

[22] Filed: May 28, 1997

[51] Int. Cl.$^6$ .................................................. G06F 12/00
[52] U.S. Cl. ...................... 712/207; 711/122; 711/133; 711/137; 711/159; 711/213; 711/218
[58] Field of Search ...................................... 395/381, 382, 395/383; 711/5, 122, 137, 157, 213, 221, 118, 119, 125, 133, 140, 159, 169, 204, 218; 712/205, 206, 207

[56] References Cited

U.S. PATENT DOCUMENTS

| | | |
|---|---|---|
| 4,918,587 | 4/1990 | Pechter et al. . |
| 5,146,578 | 9/1992 | Zangenehpour . |
| 5,261,066 | 11/1993 | Jouppi et al. ............................ 711/122 |
| 5,317,718 | 5/1994 | Jouppi . |
| 5,333,291 | 7/1994 | Grunkok et al. ......................... 711/157 |
| 5,371,870 | 12/1994 | Goodwin et al. . |
| 5,428,761 | 6/1995 | Herlihy et al. . |
| 5,461,718 | 10/1995 | Tatosian et al. . |
| 5,586,294 | 12/1996 | Goodwin et al. ......................... 711/137 |
| 5,659,713 | 12/1995 | Goodwin et al. . |
| 5,664,147 | 9/1997 | Mayfield ................................. 711/137 |
| 5,694,568 | 12/1997 | Harrison, III et al. ................. 711/213 |
| 5,737,565 | 4/1998 | Mayfield ................................. 711/213 |
| 5,761,706 | 6/1998 | Kessler et al. .......................... 711/118 |
| 5,870,599 | 2/1999 | Hinton et al. ............................ 712/239 |

OTHER PUBLICATIONS

Palacharla et al., "Evaluating Stream Buffers as a Secondary Cache Replacement", Proceedings of 21st Annual International Symposium on Computer Architecture, ACM, p. 24–33, Apr. 18–28, 1994.

*Primary Examiner*—William M. Treat
*Attorney, Agent, or Firm*—Cesari and McKenna, LLP

[57] ABSTRACT

The invention is a system providing adaptive stream buffers using instruction-specific prefetching avoidance (ISPA). According to the invention, each time the CPU executes an instruction resulting in prefetched cache lines not being used, the instruction address is stored in a table. Subsequent instruction addresses are compared to the instruction addresses in the table, and a stream buffer is not allocated when the subsequent instruction address is found within the table.

11 Claims, 5 Drawing Sheets

ADAPTIVE STREAM BUFFERS

FIELD OF THE INVENTION

This invention relates generally to computer systems, and more particularly to a method and an apparatus for improving the efficiency of prefetching data for memory systems of a computer system.

BACKGROUND OF THE INVENTION

In computer systems, the performance of processors has improved at a greater rate than the performance of hierarchical memory systems. A hierarchical memory system includes a plurality of memories, such as disk, main memory, off-chip and on-chip caches, and registers. Typically, the memories that are "farther" from the processor have longer access time latencies and larger capacities than memories "closer" to the processor. The closer memories have shorter latencies and smaller capacities.

During the operation of a hierarchical memory system, the more frequently used data are stored in memories that are closer to the processor. This is known as caching. Other data can be stored in closer memories in anticipation of the processor using such data. This is called prefetching. Such prefetched data can be stored in what is known as a stream buffer.

A stream buffer can be a small memory organized as a first-in first-out (FIFO) queue for storing a plurality of cache lines. Stream buffers can typically store four or eight cache lines along with the memory addresses of such cache lines. Cache lines often have 128 or 256 bits of data which are transferred between caches and stream buffers as a unit. It is usual to arrange a stream buffer between one or more first level, on-chip instruction and data caches, and a second level, off-chip, direct or multi-way set-associative cache.

Stream buffers exploit the sequential nature in which processors frequently execute instructions and access data. When a processor makes a request to access data at an address, the request is passed on to farther memory levels of the memory system if the requested address is missing from the first level caches. A memory level at which the address is present responds to the request by returning an entire cache line to the first level cache. This cache line includes the data at the requested address.

In addition, a stream buffer is allocated to receive and store additional cache lines that are likely to be needed next by the processor. These cache lines may be prefetched from sequential addresses in the memory system, or from addresses that are spaced apart at non-unit intervals (strides) according to techniques that are well known in the art. These prefetched cache lines are stored in the stream buffer and not in the first level cache. Because it is not known whether the prefetched data will ever be used, storing the prefetched lines directly in the first level cache could replace useful data with useless data.

Now, when a subsequently requested address is missing from the first level cache, there is a good possibility that this address is in the stream buffer. Thus, data missing at a first level cache can be quickly accessed from the prefetched cache lines stored in the stream buffer.

A prefetched cache line moves from the head of the FIFO queue in the stream buffer to the first level cache when that prefetched cache line is needed. The other cache lines in the queue move up accordingly, making room in the FIFO queue for the prefetching of additional cache lines.

Computer systems that use prefetching techniques often use more than one stream buffer. A number of different methods can be used to determine which stream buffer to allocate for receiving prefetched cache lines. One exemplary method is a least recently used algorithm.

For a detailed description of prior art stream buffers, please see, U.S. Pat. No. 5,317,718, Data Processing and Method for Prefetch Buffers, issued to Jouppi on May 31, 1994, incorporated by reference herein. The patent describes prior art stream buffers that prefetch four cache lines. This prefetching can improve the performance of a computer system when the information needed by the processor is accurately anticipated. Having the data ready in a closer memory can give a processor much faster access than if the processor had to retrieve the data from a memory that was farther away.

However, for processes that access information stored at dispersed addresses, stream buffers may only marginally improve performance. If the processor does not use the prefetched data, prefetching can actually needlessly degrade system performance. The extra data traffic generated by useless prefetching can consume memory bandwidth for no useful purpose and actually overload the memory system.

Therefore, it is desired to improve the performance of the interaction between processors and memory systems, not only for sequential processing of information, but also for those cases where the processors access the information in a non-sequential manner.

SUMMARY OF THE INVENTION

The present invention resides in a method and related apparatus for prefetching data. It is an object of the invention to more efficiently prefetch data from a memory system by reducing the amount of memory bandwidth expended on unused prefetched data.

Another object of the invention is to identify those addresses that do not lead to useful prefetching by maintaining a record of addresses for which prefetching has been unproductive.

Yet another object of the invention is to prefetch a small amount of data when it is unknown whether the processor is processing in a stream-like fashion (i.e., sequentially), and then to increase the amount of prefetching after it appears that the processor is processing instructions that reference sequentially related addresses.

In terms of the disclosed method, the invention fetches data for a processor executing an instruction that requests access to data at a first address of a first memory. The invention determines whether the requested data are stored in a second memory. An example of the second memory is a stream buffer. If the data are stored in the second memory, then the invention prefetches a first predetermined number of units of data starting from a second address of the first memory. Otherwise, it prefetches a second predetermined number of units of data starting from a third address of the first memory. The first predetermined number is greater than the second predetermined number.

In one aspect, the instruction is stored at an instruction address of the first memory. The invention determines whether the instruction address is stored in a third memory when the data at the first address are absent from the second memory. An example of the third memory is a table that stores addresses. If the first address is absent from the third memory, then the second predetermined number of units of data are prefetched starting from a second address of the first memory.

In terms of the disclosed apparatus, the invention fetches data for a processor executing an instruction that requests access to data at a first address of a first memory. A second memory is for storing prefetched units of data. A third memory is for storing addresses. The apparatus also includes means for determining whether the instruction address is stored in the third memory when the data at the first address is absent from the second memory, means for prefetching a predetermined number of units of data starting from a second address of the first memory if the first address is absent from the third memory, and means for storing the prefetched units of data in the second memory.

Other and further aspects of the present invention will be more fully appreciated by considering the following description and by reference to the accompanying drawings.

BRIEF DESCRIPTION OF THE DRAWINGS

An embodiment of the invention will be described with reference to the accompanying drawings, in which.

DETAILED DESCRIPTION OF PREFERRED EMBODIMENTS

Figure 1:
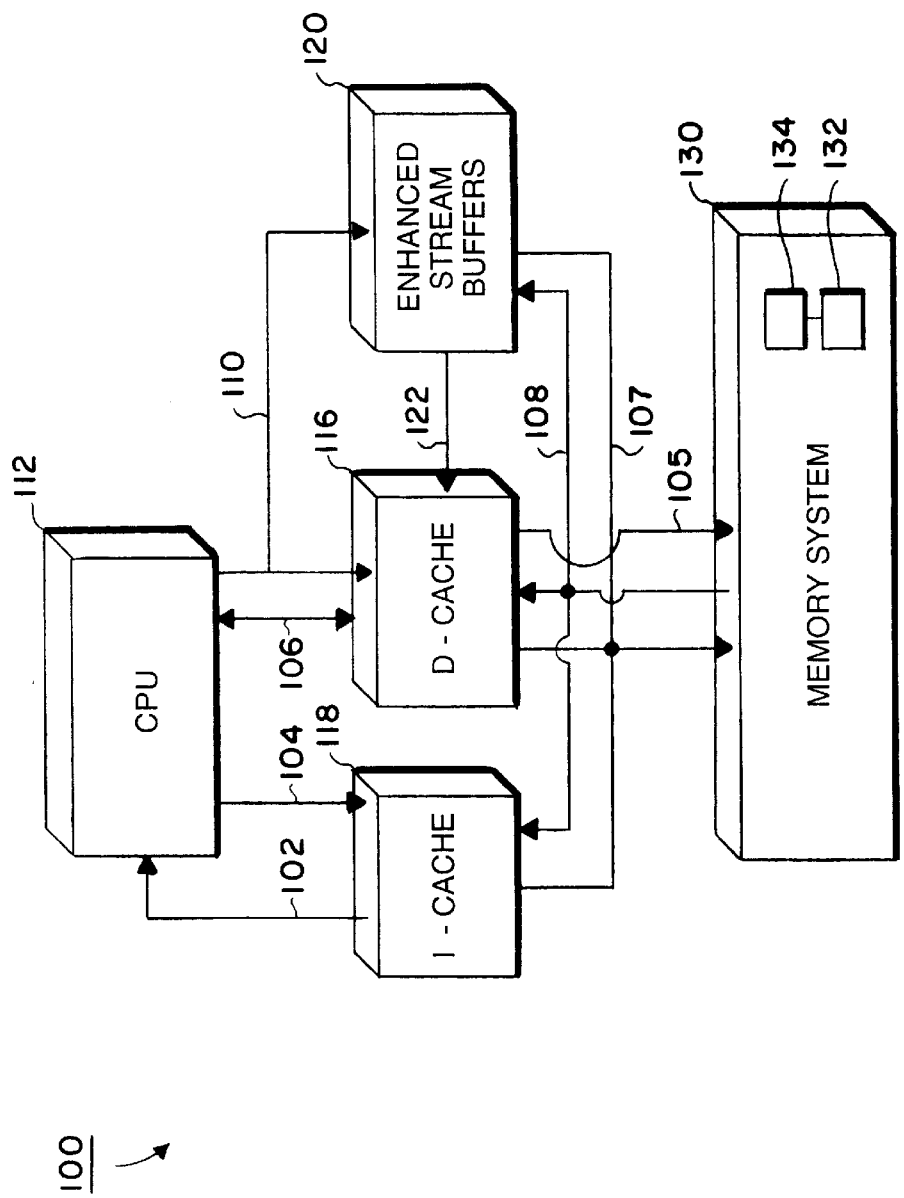
FIG. 1 is a block diagram of a system which can use stream buffers configured according to the invention.

FIG. 1 shows a system 100 which can use adaptive stream buffers according to the principles of the invention. The system 100 can be one of a variety of system types including, for example, an embedded system, a personal computer, a workstation, or a mainframe.

The system 100 includes a central processor (CPU) 112, a data cache (D-cache) 116, an instruction cache (I-cache) 118, stream buffers 120 and a memory system 130. The I-cache 118 is coupled to the CPU 112 by signal lines 102, 104, the D-cache 116 is coupled to the CPU 112 by signal lines 106, 110, and the stream buffers 120 are connected to the CPU 112 by signal lines 110. The D-cache 116 and the stream buffers 120 are also connected to each other by signal lines 122. In the preferred embodiment, the stream buffers 120 are associated with the D-cache 116. Other embodiments can use stream buffers 120 to support other levels of memory, such as a secondary cache or the I-cache 118.

The D-cache 116, the I-cache 118, and the stream buffers 120 are each electrically connected to the memory system 130 by signal lines 107, 108. The D-cache 116 is also coupled to the memory system 130 by signal lines 105 by which the D-cache 116 can send data to the memory system 130.

The central processor (CPU) 112, D-cache 116, I-cache 118, and stream buffers 120 can be integrated, for example, on a single semiconductor chip. Or such components 112, 116, 118 and 120 can be part of a larger module, along with the memory system 130. Other embodiments can have multiple CPUs 112.

The CPU 112 can be one of many various types of integrated circuit devices having either CISC or RISC architectures. The D-cache 116 and I-cache 118 are conventional on-chip first level cache memories. The caches 116, 118 store a subset of the data and instructions that are stored in the memory system 130. These caches 116, 118 are closer to the CPU 112 than the memories 132, 134 in the memory system 130. Typically, such caches 116, 118 are implemented using high speed static random access memories (SRAM).

The stream buffers 120 are small memories that can be organized as queues as described below in more detail. Each stream buffer 120 stores prefetched cache lines in anticipation of use by the CPU 112. One or more of the stream buffers 120 can be associated with the D-cache 116. These stream buffers 120 are also closer to the CPU 112 than the memories 132, 134 in the memory system 130

The memory system 130 includes a main memory 132 for storing data and instructions that may be used by the CPU 112 during the execution of software processes. The main memory 132 is farther from the CPU 112 than the first level caches 116, 118. Typically the main memory 132 is implemented using dynamic random access memories (DRAM), which have slower access times than other types of memories, such as the static random access memories (SRAM) of the first level cache 116, 118. The memory system 130 also includes a cache memory 134 for reducing the latency of an access to the memory system 130. The cache memory 134 is a second level cache that is hierarchically coupled between the main memory 132 and the first level caches 116, 118.

During the operation of the system 100, program instructions can be stored at one or more memory addresses of the main memory 132. The memory addresses at which program instructions are stored are hereafter called instruction addresses. Each instruction, when executed by the CPU 112, may reference one or more addresses of the main memory 132 for purposes of reading and writing data stored at those referenced addresses. Such referenced memory addresses are generally referred to as data addresses.

The CPU 112 probes the first level caches 116, 118 and the stream buffers 120 simultaneously for referenced addresses. The CPU 112 sends instruction addresses to the I-cache 118 via signal lines 104, and sends both instruction and data addresses to the D-cache 116 and stream buffers 120 via signal lines 110.

A large percentage of the addresses transmitted by the CPU 112 result in hits at one of the first level caches 116, 118. Consequently, instructions or data are transferred between the first level cache 116, 118 and the CPU 112 without having to access the slower memory system 130 or the stream buffers 120. The I-cache 118 sends instructions to the CPU 112 via signal line 102, and the D-cache 116 sends data to the CPU 112 via signal line 106.

However, when a cache miss occurs at the first level caches 116, 118 (i.e., the referenced data or instruction address is not at either the D-cache 116 or I-cache 118), the requested information must be accessed from either the stream buffers 120 or the memory system 130. If the referenced data address then hits at the stream buffer 120, a cache line is transferred from the stream buffer 120 to the D-cache 116 by signal line 122 without incurring the high memory latency associated with accessing the memory system 130. Cache lines are the units of data which are transferred between caches 116, 134 and stream buffers 120. In an alternative embodiment, the cache line from the stream buffer 120 might be transferred directly to the CPU 112.

In the event the referenced instruction or data address is not at the stream buffers 120, the referenced instruction or data address is passed to the memory system 130 via signal line 107. A cache line that includes the data at the requested address is retrieved from the memory system 130, and transferred to the appropriate first level cache 116, 118 via signal line 108. The cache line can be accessed at either the main memory 132 or the second level cache 134. This access incurs an access time latency associated with the type of memory components used to implement the memory 132, 134 from which the cache line is taken.

In conjunction with retrieving the cache line from the memory system 130, one of the stream buffers 120 may be allocated for prefetching one or more additional cache lines, which are then prefetched according to the principles of the invention. The cache lines can be prefetched from either the main memory 132 or the second level cache 134. The prefetching may be done by software implemented processes, or by hardware, or combinations of both.

When one of the stream buffers 120 is allocated for prefetching, the allocated stream buffer flushes (i.e., discards) any data presently stored in that stream buffer. Some of this data can be preserved in another memory location as described below.

The prefetching of cache lines can be made more efficient by using two techniques: incremental prefetching and instruction-specific prefetching avoidance (ISPA). Both methods can independently reduce the memory traffic due to prefetching. Each technique adapts the degree of prefetching according to the usefulness of previous prefetching. Use of such techniques can reduce the number of prefetched cache lines that are not subsequently needed by the CPU 112. Although the stream buffers 120 of the preferred embodiment implement both prefetching techniques, the techniques are capable of operating independently of each other.

Figure 2:
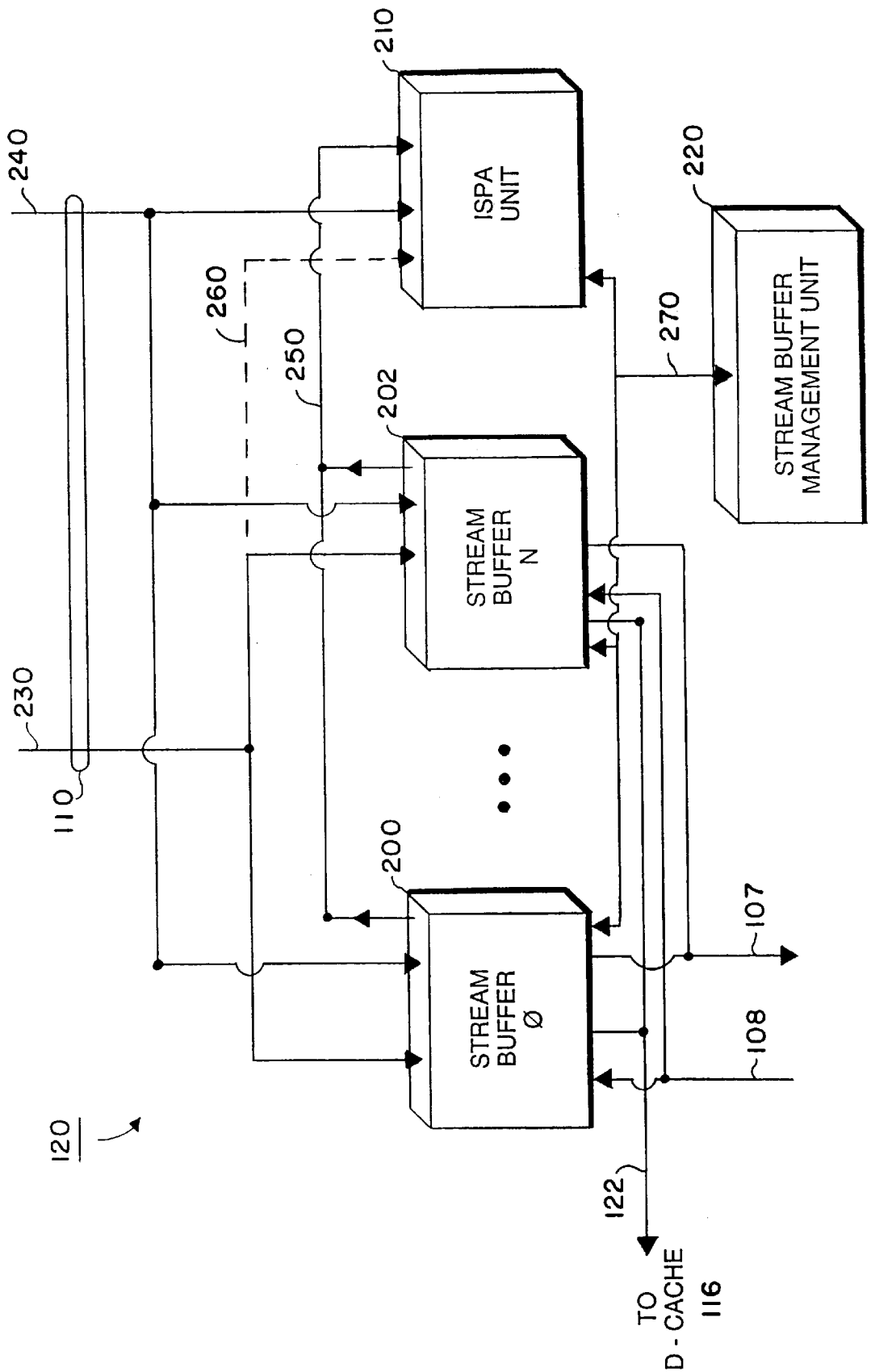
FIG. 2 is a block diagram showing the enhanced stream buffers including two exemplary stream buffers, and an instruction-specific prefetch avoidance (ISPA) unit.

FIG. 2 shows the enhanced stream buffers 120 including, for illustration purposes, two stream buffers 200, 202, and an instruction-specific prefetch avoidance (ISPA) unit 210. Signal lines 110 of FIG. 1 include signal lines 230 for carrying data addresses and signal lines 240 for carrying instruction addresses. Each stream buffer 200, 202 receives signal lines 230 and 240. The ISPA unit 210 receives instruction address signals 240. In an alternative embodiment, as set forth by dotted line 260, the ISPA unit 210 also receives data addresses 230.

The stream buffer management unit 220 includes circuitry for allocating stream buffers of prefetching. For an example of such allocation circuitry, please see U.S. Pat. No. 5,371, 870, Stream Buffer Memory having a Multiple-entry Address History Buffer for Detecting Sequential Reads to Initiate Prefetching, issued to Goodwin et al. on Dec. 6, 1994, incorporated by reference herein. The stream buffer management unit 220 is coupled to each stream buffer 200, 202 and the ISPA unit 210 by signal lines 270.

Figure 3:
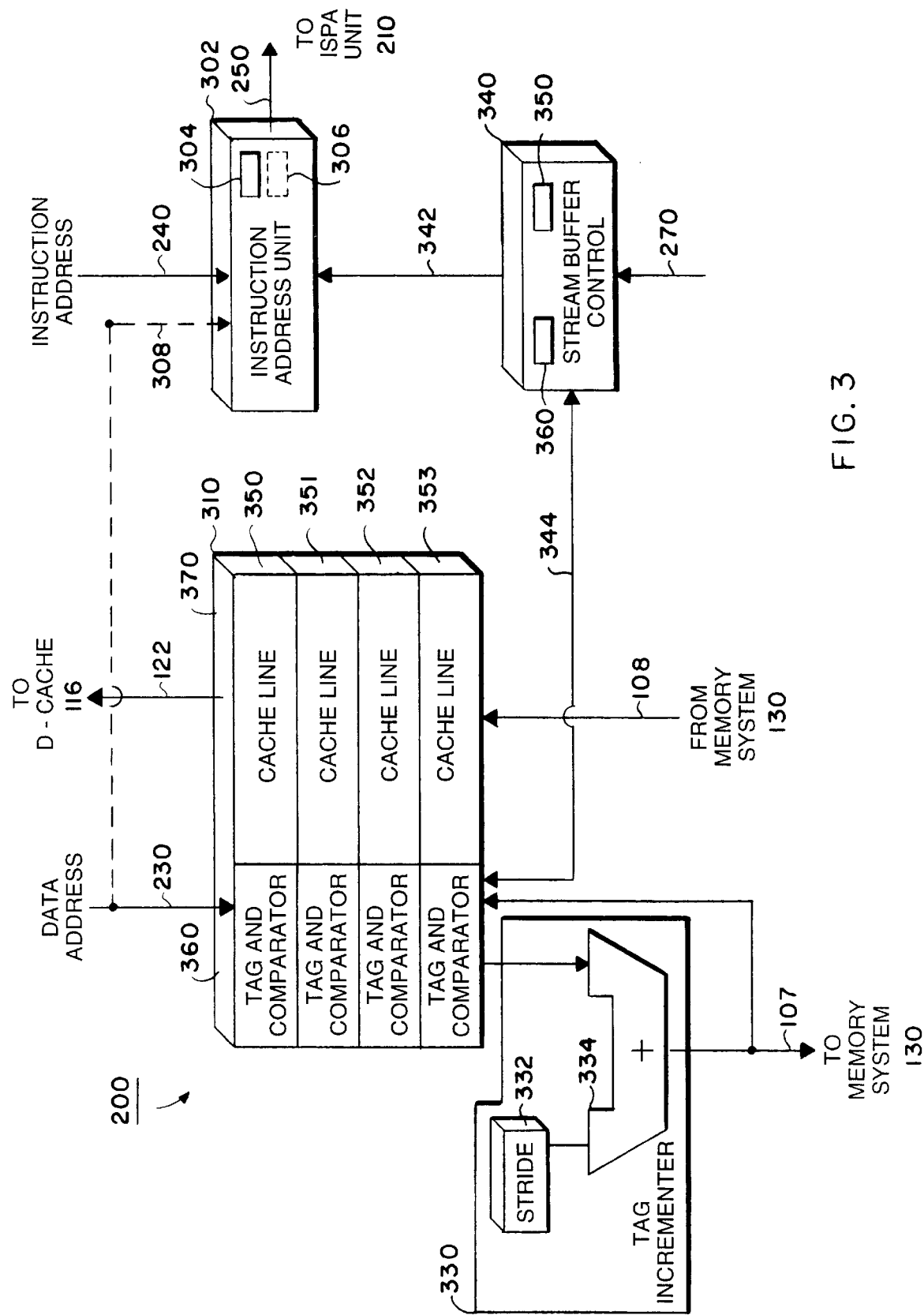
FIG. 3 is a block diagram of an exemplary embodiment of an enhanced stream buffer.

FIG. 3 shows the stream buffer 200 as a representative example of the stream buffers 120 in the preferred embodiment. The stream buffer 200 includes an instruction address unit 302 coupled to a stream buffer control 340 by control lines 342, and a queue 310 coupled to a tag incrementer 330. The stream buffer control 340 is coupled to the queue 310 by control lines 344.

The instruction address (IA) unit 302 includes a register 304 for storing a particular instruction address. This particular instruction address is the address of the instruction executed by the CPU 112 that led to the allocating of the stream buffer 200 and the prefetching of any cache lines currently stored therein. In an alternative embodiment, the instruction address unit 302 also includes a second register 306. The second register 306 stores the address of the cache line that contains the data address referenced by the instruction whose instruction address is stored in register 304.

The IA unit 302 includes two inputs: the first receives controls signals from the stream buffer control 340 by signal lines 342; and the second receives addresses of instructions executed by the CPU 112 by signal lines 240. The alternative embodiment has a third input, represented as dotted line 308, for receiving the cache line address stored in register 306. The IA unit 302 includes an output, coupled to the ISPA unit 210 of FIG. 2 by signal lines 250, for sending the contents of the register 304 (and register 306 of the alternative embodiment) to the ISPA unit 210 according to the principles of the invention.

The exemplary queue 310 has four entries 350–353. Alternatively, there can be fewer or more entries. Each entry 350–353 includes a tag and a comparator 360 and a cache line 370. The head of the queue 310 is the entry 350, and the tail is the entry 353 when the queue 310 is full. (When the queue 310 is not full, the tail entry is the last entry containing cache line data.) The tag 360 provides an index to the data stored as a prefetched cache line in the cache line field 370. The comparator of each entry 350–353 compares the corresponding tag with the data addresses of memory references by the CPU 112. In an alternative embodiment, only the head entry 350 may have a comparator 360, while the remaining entries 351–353 have only a tag.

The tag incrementer 330 is coupled to receive either the tag 360 of the tail entry in the queue 310, or the data address 230 when the stream buffer 200 is first allocated, and to send the address of the next cache line to be prefetched to the memory system 130 by signal lines 107. The tag incrementer 330 includes a stride unit 332 and an adder 334. The stride unit 332 provides a value for incrementing the tag when generating the next cache line address. When prefetching cache lines from successive cache line addresses of the memory system 130, this value is one. It is to be understood that incrementing by one actually increments by 16 (or 32) byte addresses, depending upon the size of a cache line. Values greater than one allow cache lines to be prefetched from non-consecutive cache line addresses.

The stream buffer control 340 includes a flag 350 and a finite state machine 360. The ISPA method can use the flag 350 to indicate whether any cache lines prefetched and stored in the stream buffer 200 have been subsequently used by the CPU 112. The incremental prefetching method can use the finite state machine 360 to control the incremental prefetching behavior of the stream buffer 200 as described below.

Figure 4:
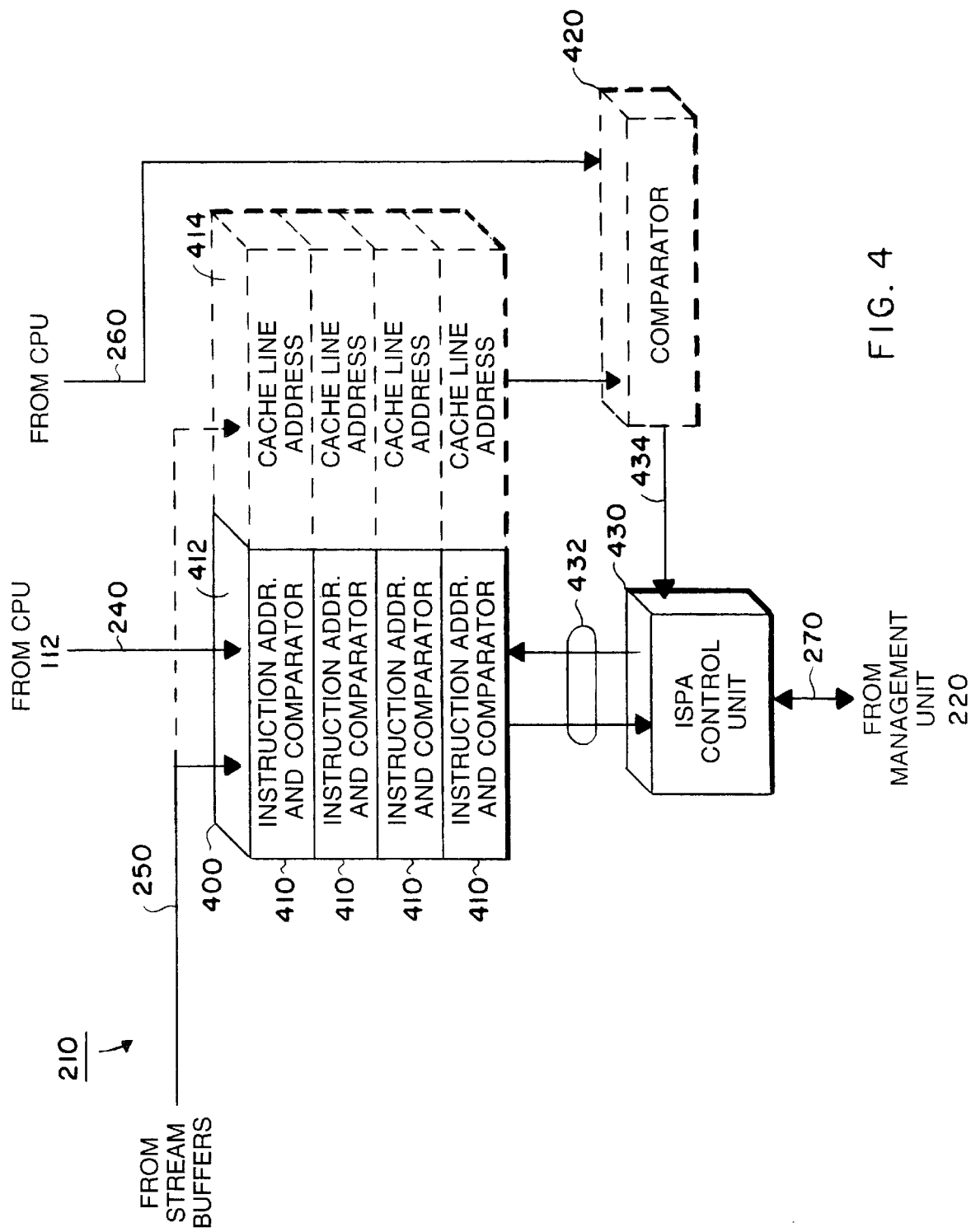
FIG. 4 is a block diagram of the ISPA unit shown in FIG. 2.

FIG. 4 shows the ISPA unit 210 of FIG. 2 including an ISPA table 400 of entries 410 coupled to an ISPA control unit 430 by signal lines 432. As described below, the ISPA prefetching method uses the ISPA table 400 to determine whether or not to prefetch cache lines from the memory system 130. Each entry 410 has an instruction address field 412 for storing the instruction address of an executed instruction that led to prefetching that subsequently proved unproductive. Unproductive prefetching means that none of the prefetched cache lines stored in the stream buffer 200 was subsequently used before the stream buffer 200 became allocated for prefetching a new stream of cache lines.

Each instruction address field 412 includes a comparator. The comparator compares the instruction address stored in the address field 412 with the instruction address sent from the CPU 112 on signal lines 240. The output of each comparator is coupled to the ISPA control unit 430 via signal lines 432 by which the ISPA control unit 430 receives the result of the comparisons between the instruction address and the instruction addresses stored in the ISPA table 400. The ISPA control unit 430 can select and remove entries 410 from the table 400 as described below.

In an alternative embodiment, each entry 410 also has a cache line address field 414. The cache line address field 414 stores the last data address referenced by the instruction whose instruction address is stored in the corresponding instruction address field 412. The ISPA table 400 can be a type of cache mechanism where the instruction address field 412 corresponds to a tag and the cache line address field 414 corresponds to data.

This alternative embodiment also includes a comparator 420 that is coupled to the ISPA table 400 for comparing data addresses referenced by the CPU 112 (on signal line 260) with data addresses stored in the cache line address fields 414. The ISPA control unit 430 receives the results of the comparisons from the comparator 420 via signal lines 434.

Operation of the system 100 is now described. For illustration purposes only, the stream buffer 200 is associated with the D-cache 116. The CPU 112 executes an instruction that references a data address. The instruction address and the data address are passed to both the D-cache 116 and the stream buffer 200 via signal lines 110. The referenced data address is compared with the tags of the D-cache 116 and the stream buffers 120. A hit occurs when one of the tags matches the referenced data address.

When the referenced data address misses at the D-cache 116, but hits at one of the stream buffers 120, e.g., stream buffer 200, the stream buffer 200 transfers the cache line 370 associated with the matched tag 360 to the D-cache 116 via signal lines 122. This transfer occurs far more quickly than when the cache line data 370 has to be retrieved from the memory system 130. The remaining entries in the queue 310 shift towards the head 350 of the queue 310 to replace the vacated entry.

When there is a miss at both the D-cache 116 and at the stream buffers 120, the management unit 220 determines whether or not to allocate one of the stream buffers 120 to receive a new stream of prefetched cache lines. When a stream buffer 200, 202 is to be allocated, the management unit 220 can determine which stream buffer 200, 202 by using a conventional selection technique, such as, for example, a least recently used algorithm. The management unit 220 then signals the stream buffer control 340 of the selected stream buffer, e.g., stream buffer 200 to prefetch data.

The allocated stream buffer 200 can then prefetch cache lines from the memory system 130. The tag incrementer 330 computes the memory address of the next cache line to be prefetched by adding the stride value to either the data address 230 when the stream buffer 200 is first allocated, or to the tag 360 of the tail queue entry, and sends this memory address to the memory system 130 via signal lines 107. The memory system 130 returns the requested cache line to the tail of the queue 310 via signal lines 108. The data of the prefetched cache line are stored in the cache line field 370.

The allocated stream buffer 200 may prefetch cache lines using either the incremental prefetching method or the instruction specific prefetching avoidance (ISPA) method. The incremental prefetching and ISPA methods can operate independently of each other, or in combination as described below. Stream buffers 120 that use these methods can adaptively tune the prefetching operation to the processing activity of the CPU 112.

INCREMENTAL PREFETCHING

The incremental prefetching method prefetches only a partial stream until it is known that the CPU 112 is actually processing memory addresses in a stream-like, e.g., sequential fashion. Thus, only a small predetermined number of cache lines are initially prefetched upon a miss at both the D-cache 116 and at the stream buffers 120.

When it has been determined that prefetched cache lines are being used, then the incremental prefetching method increases the number of cache lines to prefetch. In the preferred embodiment, using a prefetched cache line means accessing the prefetched cache line in the stream buffer 200 and transferring the prefetched cache line to either the D-cache 116 or the CPU 112.

By delaying the prefetching of an entire stream (i.e., retrieving enough cache lines to fill the stream buffer 200), less memory bandwidth is wasted transferring and storing cache lines that are never used. Simulations have shown that the incremental prefetching method can reduce by half the additional memory bandwidth required by systems that use stream buffers. This improvement can be achieved without a significant reduction in processor performance.

When the stream buffer 200 is allocated for prefetching, the stream buffer 200 is in a first state. In this first state, the stream buffer 200 of the preferred embodiment initially prefetches one cache line from the memory system 130. Note that these misses lead to the initial prefetching, in contrast to other implementations that initiate prefetching only after a sequential relationship is detected between addresses of consecutive requests.

If that prefetched cache line is subsequently used on the next occurrence of a cache miss at the D-cache, then the stream buffer 200 transitions to a second state. In the second state, the stream buffer prefetches two more cache lines from the memory system 130. The two new prefetched cache lines can have addresses that either sequentially follow the previously prefetched cache line, or the addresses can be non-sequential, being selected according to any one of several non-stride unit techniques known in the art.

If the first of the two new prefetched cache lines is subsequently used, then the stream buffer 200 transitions to a third state, and an additional two cache lines are prefetched. Thereafter, for each cache line in the queue 310 that is subsequently used, two more new cache lines are prefetched. This can continue until the queue 310 becomes full. Once the stream buffer queue 310 is full, the incremental prefetching operates like the prefetching of a conventional stream buffer (i.e., only one new cache line is prefetched for each cache line removed from the queue 310). This is a fourth operating state of the stream buffer 200.

Throughout the prefetching of cache lines, the finite state machine 360 maintains the operating state of the stream buffer 200, and controls the number of cache lines prefetched by the stream buffer 200.

INSTRUCTION SPECIFIC PREFETCHING AVOIDANCE

The instruction specific prefetching avoidance (ISPA) method uses the performance of previous prefetches to determine whether or not to prefetch when references to certain instruction addresses recur. Thus, if previous prefetches for a particular instruction address were not subsequently used, then the ISPA method can avoid prefetching when that particular instruction address is referenced again. Once again, less memory bandwidth is wasted transferring cache lines to the stream buffer 200 that are never accessed by the CPU 112.

To illustrate: a computer program is made up of various subroutines, some of which contain loops. A particular instruction within a loop may act only to increment a loop counter, for example, for that loop. Prefetching cache lines that sequentially follow the memory address where that counter is stored is unlikely to prove productive. Once it is determined that prefetching for that particular instruction is unproductive, then there is little reason to prefetch for that particular instruction when it is executed during a subsequent call to that subroutine. The ISPA method can filter out potentially unproductive prefetches by withholding allocation of a stream buffer when such instructions are executed again.

When the management unit 220 does allocate the stream buffer 200 for prefetching, the stream buffer 200 flushes any data stored in the queue 310. If the flag 350 is currently set, this indicates that none of the previously prefetched cache lines stored in the stream buffer 200 were subsequently used. In this case, the stream buffer control 340 signals the instruction address unit 302 to send any instruction address stored in the register 304 (and, in the alternative embodiment, the cache line address in register 306) to the ISPA table 400. This instruction address is then stored in an instruction address field 412 in a table entry 410 (and in the alternative embodiment, the cache line address is stored in the cache line address field 414.

After the stream buffer 200 is flushed, the stream buffer 200 prefetches one or more cache lines, storing the data of each prefetched cache line into the cache line field 370 of one of the entries 350–353. Likewise, the instruction address of the executed instruction that caused the cache miss is stored in the register 304. The stream buffer control 340 sets the flag 350. (In the alternative embodiment, the cache line address is stored in the register 306.)

If none of the newly prefetched cache lines is subsequently used before the stream buffer 200 is again allocated for prefetching, the instruction address in the register 304 is also copied into an instruction address field 412 of an entry 410 of the ISPA table 400. The associated cache line address is stored in the cache line address field 414 of that entry 410. In the event one of the newly prefetched cache lines in the queue 310 is used, the control 340 resets the flag 350, and the stream buffer 200 transfers the data of that cache line to the first level D-cache 116 (or to the CPU 112).

Each time the CPU 112 executes an instruction that causes a first level cache 116 miss, the instruction address is compared with those instruction addresses stored in the ISPA table 400. The ISPA control unit 430 receives the result of the comparison, and forwards the result to the management unit 220. The management unit 220 does not allocate a stream buffer 200, 202 for this cache miss when there is an instruction address match. Thus, prefetching does not occur. The fundamental principle is that data currently in the stream buffer 200 may be more useful than any data that would be prefetched with an instruction having a prefetch history that indicates prefetching does not yield useful data. This not only reduces the memory bandwidth requirements of each stream buffer 120, but also thrashing that is caused by stream buffer allocation, particularly in systems that experience many cache misses and have only a few stream buffers.

In the preferred embodiment, there is no prefetching when a subsequent instruction causes a cache miss and the address of that instruction matches a particular instruction address stored in the ISPA table 400. In the alternative embodiment, however, should the subsequent instruction indicate that prefetching might be useful for that instruction address, prefetching can still occur. The comparator 420 compares the cache line address of the data address referenced by that subsequent instruction with the cache line address 414 corresponding to the matched particular instruction address 412. If the two cache line addresses differ by one, then the ISPA control unit 430 can remove that particular instruction address from the ISPA table 400. Removal of the particular instruction address can be achieved by marking the corresponding entry 410 as invalid.

If, on the other hand, the comparison of the cache line addresses differs by more than one, then the cache line address referenced by the subsequent instruction is written into the cache line address field 414 corresponding to that particular instruction address 412. Thus, the latest referenced data address is recorded in the ISPA table 400 as the last data address referenced by that particular instruction.

A variety of other replacement schemes, such as random replacement, can be used for instruction addresses 412 in the entries 410 of the ISPA table 400. Removing an instruction address 240 from the table 400 gives the instruction stored at that instruction address another opportunity to cause prefetching in the event that the CPU 112 subsequently executes that instruction again.

If the referenced load address is not found within ISPA table 400, then the stream buffer 200 can prefetch according to conventional stream buffer practices, as discussed above, or control the amount of prefetched cache lines such as the incremental prefetching method described above.

Figure 5:
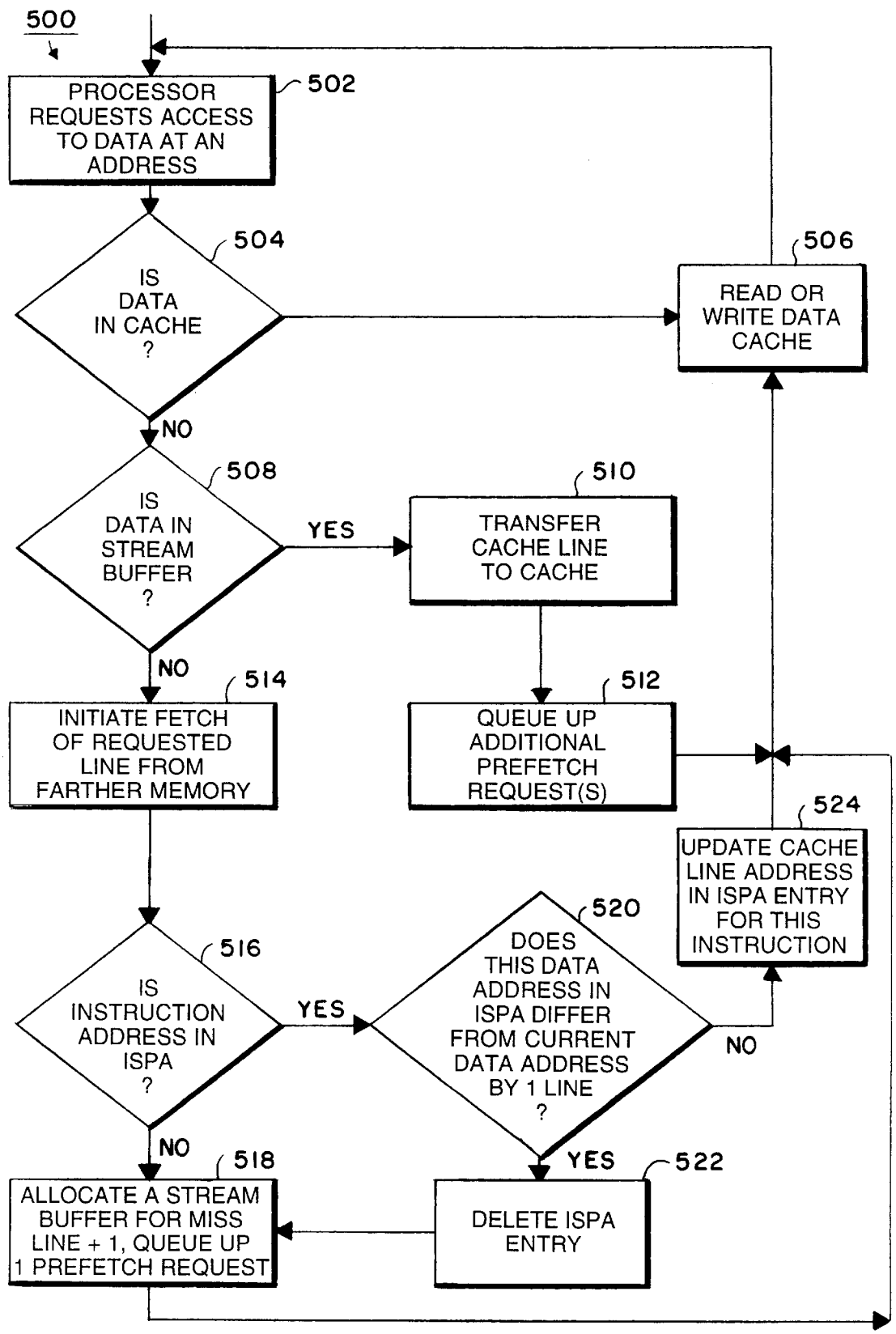
FIG. 5 is a flow chart showing a method by which prefetching data is controlled according to the principles of the invention.

FIG. 5 shows a flow chart 500 illustrating an exemplary method by which both aforementioned prefetching methods can be used by the stream buffers 120. Although the example set forth in FIG. 5 shows both methods operating in combination, both methods can also operate independently of each other.

In step 502, the CPU 112 issues a request to access data at an address in the memory system 130. The stream buffers 120 and the D-cache 116 concurrently receive the access request over the signal lines 110.

In step 504, it is determined whether the requested address is in the D-cache 116. If the address is in the D-cache 116, then there is a cache hit, and the CPU 112 can read or write data at the first level D-cache 116 (step 506). Otherwise, there is a cache miss and the stream buffers 120 determine whether the referenced address is stored in a stream buffer queue 310 (step 508). In the preferred embodiment, this involves comparing the referenced data address with the tag 360 of the each entry 350–353 of the queue 310.

When there is a hit at one of the stream buffers 120, that stream buffer, e.g. 200, transfers the corresponding cache line to the first level D-cache 116, and the CPU 112 can access data associated with the referenced address without having to retrieve the cache line from the memory system 130 (step 510).

Use of a previously prefetched cache line indicates that the CPU 112 is actually referencing a stream of addresses. Thus, it is likely that prefetching can produce useful data. In step 512, the stream buffer 200 requests the prefetching of a predetermined number of cache lines from the memory system 130. In the preferred embodiment, the predetermined number of prefetched cache lines is two. If, after prefetching the first of the two cache lines, the stream buffer queue 310 is full (all four entries 350–353 have data), then the prefetching stops after one cache line.

If there is a miss at the stream buffers 120, then, in step 514, the data of the cache line are requested from a farther memory. Also, it is determined whether or not to prefetch cache lines in response to this cache and stream buffer 120 miss. The instruction address of the instruction executed by the CPU 112 is compared with the instruction addresses stored in the ISPA table 400 (step 516). The stream buffer management unit 220 does not allocate a stream buffer for prefetching when the instruction address matches an instruction address in the ISPA table 400. The alternative embodiment, steps 520–524, illustrates a condition under which prefetching may still occur.

If there is no match between the instruction address of the instruction executed by the CPU 112 and an instruction address in the ISPA table 400, the management unit 220 allocates one of the stream buffers 120 for prefetching (step 518). This allocated stream buffer 200 queues up a predetermined number of cache lines for prefetching into the queue 310. When performing the incremental prefetching method of the preferred embodiment, this predetermined number is one cache line. For a conventional prefetching method, this predetermined number may equal the number of available entries in the stream buffer queue.

Steps 520–524 illustrate an alternative embodiment that uses cache line address fields 414. If there is a match between the instruction address 240 of the instruction executed by the CPU 112 and an instruction address 412 in the ISPA table 400, then the comparator 420 compares the cache line address of data address 260 referenced by that executed instruction 240 with the cache line address 414 of the same entry 410 as that matched instruction address 412 (step 520). If the cache line addresses differ by one, then the ISPA control unit 430 deletes the entry 410 containing the matched instruction address 412 from the table 400. Because the addresses differed only by one, this indicated that the cache line for the requested data address 260 sequentially followed the cache line address 414 referenced the last time the CPU 112 executed this instruction. The management unit 220 can then allocate one of the stream buffers 120 for prefetching (step 518), and the allocated stream buffer 200 can queue up a predetermined number of cache lines for prefetching into the queue 310.

If the addresses do not differ by one, then the management unit 220 does not allocate a stream buffer 120 for prefetching. Also, the ISPA control unit 430 updates the entry 410 with the matched instruction address 412 by storing the data address 260 referenced by that executed instruction 240 in the corresponding cache line address 414 field.

Whether or not a stream buffer prefetches cache lines, the misses at both D-cache 116 and the stream buffers 120 cause the cache line that includes the data address referenced by the executed instruction of step 502 to be retrieved from the memory system 130 and stored in the first level D-cache 116, where the CPU 112 can read or write data (step 506).

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

I claim:

1. A method for prefetching data to a computer readable memory for possible use by a processor, the method comprising the steps of:
  a) providing a table for storing unproductive prefetch instruction addresses;
  b) for each memory reference instruction issuing from the processor that encounters a cache miss, performing the following steps:
    i) determining whether an instruction address of the issued instruction matches any of the unproductive prefetch instruction addresses stored in the table;
    ii) selectively allocating the computer readable memory to prefetch data only when the instruction address of the issued instruction does not match any of the unproductive prefetch instruction addresses stored in the table;
    iii) determining whether data prefetched for the issued instruction is productive; and
    iv) selectively storing the instruction address of the issued instruction in the table as an unproductive prefetch instruction address only when data prefetched for the issued instruction is not productive.

2. The method of claim 1 further comprising a plurality of computer readable memories, the step of selectively allocating the computer readable memory further comprising the step of selectively allocating one of the plurality of computer readable memories when the instruction address of the issued instruction does not match any of the unproductive prefetch instruction addresses stored in the table.

3. The method of claim 1, wherein the computer readable memory comprises a stream buffer.

4. The method of claim 1, wherein the step of determining whether data prefetched for the issued instruction is productive further comprises the steps of:
  a) setting a flag when the computer readable memory is allocated to prefetch data for an earlier instruction;
  b) unsetting the flag if the prefetched data in the computer readable memory is used;
  c) determining whether the flag is set when the computer readable memory is allocated to prefetch data for a later instruction; and
  d) selectively storing an instruction address of the earlier instruction only if the flag is set when the computer readable memory is allocated to prefetch data for the later instruction.

5. The method of claim 1, further comprising the step of selectively removing an unproductive prefetch instruction address from the table when a later instruction references data prefetched to the computer readable memory by an earlier instruction.

6. An apparatus for prefetching data to a computer readable memory for possible use by a processor, the apparatus comprising:
  a processor, the processor periodically issuing instructions;
  a main memory;
  a computer readable memory for prefetching data from the main memory in response to a memory reference instruction issued from the processor that encounters a cache miss, the instruction having an instruction address;
  a table for storing the instruction address of the instruction as an unproductive prefetch instruction address when it is determined that the data prefetched to the computer readable memory was not used;
  an instruction-specific prefetch avoidance unit connected to the computer readable memory, the processor, and the table for preventing the computer readable memory from prefetching data in response to any subsequent instruction having an instruction address that matches an unproductive prefetch instruction address stored in the table.

7. The apparatus of claim 6 further comprising a plurality of computer readable memories.

8. The method of claim 6, wherein the computer readable memory comprises a stream buffer.

9. The apparatus of claim 6, wherein the computer readable memory further comprises a flag, the flag being set when the computer readable memory is allocated to prefetch data, and the flag being unset when the prefetched data is used, thereby permitting a determination of whether the prefetched data is productive when the computer readable memory is re-allocated.

10. The apparatus of claim 6, further comprising a means for removing a stored unproductive prefetch instruction address from the table.

11. A system for adaptively managing stream buffers, the system comprising:

means for periodically issuing instructions having instruction addresses;

a main memory;

means for allocating a plurality of stream buffers to prefetch data from the main memory in response to an instruction from the instruction issuing means;

means for determining whether data has been productively prefetched in response to a particular instruction address from the instruction issuing means; and means, responsive to the means for determining whether data has been productively prefetched, for preventing the allocation of a stream buffer when the instruction issuing means subsequently issues instructions having the same instruction address as the particular instruction address;

whereby a stream buffer is not allocated in response to a subsequent instruction when a previous prefetch for the instruction address of the subsequent instruction has not been productive.

\* \* \* \* \*